United States Patent
Heath (10) Patent No.: US 6,842,437 B1
(45) Date of Patent: Jan. 11, 2005

(54) SYSTEM FOR PROVIDING SATELLITE BANDWIDTH ON DEMAND EMPLOYING UPLINK FRAME FORMATTING FOR SMOOTHING AND MITIGATING JITTER AND DYNAMICALLY CHANGING NUMBERS OF CONTENTION AND DATA CHANNELS

(75) Inventor: Robert Jeff Heath, San Diego, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/518,452

(22) Filed: Mar. 3, 2000

Related U.S. Application Data (60) Provisional application No. 60/122,741, filed on Mar. 4, 1999.

(51) Int. Cl.[7] .............................................. H04B 7/212
(52) U.S. Cl. ....................... 370/322; 370/337; 370/348; 370/449
(58) Field of Search ................................ 370/326, 336, 370/337, 348, 322, 449, 347, 412, 418, 444, 457, 458

(56) References Cited

U.S. PATENT DOCUMENTS

| | | |
|---|---|---|
| 3,848,093 A | 11/1974 | Edstrom |
| 3,851,104 A | 11/1974 | Willard et al. |

(List continued on next page.)

FOREIGN PATENT DOCUMENTS

| | | |
|---|---|---|
| EP | 0790714 A3 | 6/1997 |
| EP | 0790714 A2 | 6/1997 |
| EP | 0 790 714 A2 | 8/1997 |
| GB | 2 306 859 A | 5/1997 |

OTHER PUBLICATIONS

"ATM via satellite: A framework and implementation", Anthony Hung, Marie–Jose Montpetit, and George Kesidis, Wireless Networks 4 (1998) 141–153.
"ATM Via Satellite: A Framework and Implementation" Wireless Networks, US, ACM, Hung et al, vol. 4, No. 2, Feb. 1, 1998 (pp. 141–153).
"Small–Terminal TDMA Satcom Networks; Concepts, Techniques, and Implementation", Ronald J. Huff, Proceedings of the Seventh Hawaii International Conference On System Sciences, 1974, pp. 212–215.
"A New Satellite Multiple Access Technique for Packet Switching Using Combined Fixed and Demand Assignments", H. Ahmadi, et al, Nov. 30–Dec. 4, 1980, National Telecommunications Conference Conf. Record vol. 1 of 4, pp. 70.4.1–70.4.5.

*Primary Examiner*—Chau Nguyen
*Assistant Examiner*—Nittaya Juntima
(74) *Attorney, Agent, or Firm*—John T. Whelan (57) ABSTRACT

A method of transmitting time division multiplexed data from a satellite terminal to a satellite wherein the satellite terminal receives a command indicating to transmit data during a frame comprising a plurality of timeslots in accordance with a timeslot reordering scheme. The timeslot reordering scheme is selected to spread data from respective satellite terminals to different timeslots throughout the frames. A processor monitors the use of channels by the satellite terminals, stores bandwidth requests using queues, allocates channels in accordance with bandwidth requests and a bandwidth allocation algorithm, and transmits the channel allocations in a frame. Timeslots not allocated to any of the satellite terminals are contention channels. The number of contention channels changes dynamically, depending on demand for the plurality of channels by the satellite terminals. Queues are provided for each channel for storing high and low priority rate requests and high and low priority volume requests. The bandwidth allocation algorithm determines the preemption of the queues, and allocation priorities.

40 Claims, 6 Drawing Sheets

U.S. PATENT DOCUMENTS

| | | | |
|---|---|---|---|
| 3,879,581 A | | 4/1975 | Schlosser et al. |
| 4,220,821 A | | 9/1980 | Lucas |
| 5,167,035 A | * | 11/1992 | Mann et al. .................... 714/4 |
| 5,197,125 A | | 3/1993 | Engle et al. |
| 5,235,598 A | * | 8/1993 | Sasuta ....................... 370/327 |
| 5,448,621 A | | 9/1995 | Knudsen |
| 5,677,905 A | | 10/1997 | Bigham et al. |
| 5,699,355 A | * | 12/1997 | Natarajan ................... 370/322 |
| 5,732,078 A | | 3/1998 | Arango |
| 5,742,594 A | * | 4/1998 | Natarajan ................... 370/336 |
| 5,757,784 A | | 5/1998 | Liebowitz et al. |
| 5,778,318 A | * | 7/1998 | Talarmo et al. .......... 455/452.1 |
| 5,790,535 A | * | 8/1998 | Kou ........................... 370/337 |
| 5,812,545 A | | 9/1998 | Liebowitz et al. |
| 5,864,541 A | | 1/1999 | Abu-Amara et al. |
| 5,883,819 A | | 3/1999 | Abu-Amara et al. |
| 5,886,907 A | | 3/1999 | Abu-Amara et al. |
| 5,920,547 A | * | 7/1999 | Werth ........................ 370/280 |
| 6,078,577 A | * | 6/2000 | Bishop et al. .............. 370/348 |
| 6,366,761 B1 | * | 4/2002 | Montpetit .................. 455/12.1 |
| 6,603,747 B2 | * | 8/2003 | Asai ........................... 370/322 |

* cited by examiner

| 16 | 24 | 0 | 8 |
|----|----|----|----|
| 20 | 28 | 4 | 12 |
| 18 | 26 | 2 | 10 |
| 22 | 30 | 6 | 14 |
| 17 | 25 | 1 | 9 |
| 21 | 29 | 5 | 13 |
| 19 | 27 | 3 | 11 |
| 23 | 31 | 7 | 15 |

*FIG. 7*

| 31 | 23 | 15 | 7 |
|----|----|----|----|
| 27 | 19 | 11 | 3 |
| 29 | 21 | 13 | 5 |
| 25 | 17 | 9 | 1 |
| 30 | 22 | 14 | 6 |
| 26 | 18 | 10 | 2 |
| 28 | 20 | 12 | 4 |
| 24 | 16 | 8 | 0 |

*FIG. 8*

| 15 | 7 | 31 | 23 |
|----|----|----|----|
| 11 | 3 | 27 | 19 |
| 13 | 5 | 29 | 21 |
| 9 | 1 | 25 | 17 |
| 14 | 6 | 30 | 22 |
| 10 | 2 | 26 | 18 |
| 12 | 4 | 28 | 20 |
| 8 | 0 | 24 | 16 |

*FIG. 9*

SYSTEM FOR PROVIDING SATELLITE BANDWIDTH ON DEMAND EMPLOYING UPLINK FRAME FORMATTING FOR SMOOTHING AND MITIGATING JITTER AND DYNAMICALLY CHANGING NUMBERS OF CONTENTION AND DATA CHANNELS

This application claims the benefit of U.S. provisional application Ser. No. 60/122,741, filed Mar. 4, 1999.

FIELD OF THE INVENTION

The invention relates to a system for providing bandwidth on demand for a satellite uplink. More particularly, the invention relates to a bandwidth on demand system that employs a dynamic number of contention channels with which satellite terminals can request bandwidth, on-board queuing of bandwidth requests and a frame format that promotes smoothing and mitigates jitter.

BACKGROUND OF THE INVENTION

Bandwidth on demand (BOD) in a satellite communication is advantageous because it makes more efficient use of the finite uplink resources of the satellite and correspondingly increases uplink capacity and useable bandwidth. Bandwidth efficiency, and in particular uplink bandwidth efficiency, is important when determining the profitability of a satellite communication system. Downlink efficiency generally becomes an issue when uplink efficiency approaches 100 percent.

A number of BOD satellite communication systems have been proposed. In a conventional BOD satellite system, a pre-assigned number of contention channels and data channels are configured by the system operator and are permanently assigned until they are reconfigured. Such a design is disadvantageous because the demand for contention channels can change. A satellite communication system using such a design makes less efficient use of the uplink bandwidth because contention channels could be used for data traffic when the demand for contention channels is low.

Other conventional BOD-type communication systems support only constant bit rate requests. User terminals requesting a constant bit rate are allocated permanent portions of a data channel until the user terminal requests that the allocation be terminated. A user terminal needing uplink bandwidth to send a file therefore requests a certain bit rate, sends the file, and then sends a de-allocation message to terminate the allocation. This approach is disadvantageous because of the increased messaging to set-up and de-allocate temporary channels which could otherwise be used for less bursty type traffic.

Conventional bandwidth on demand communication systems generally assign bandwidth in response to a bandwidth request via a single allocation. Thus, if the entire bandwidth request could not be satisfied, the user terminal would have to make additional bandwidth requests to obtain an allocation for the unsatisfied portion of the previous bandwidth requests.

A need therefore exists for a BOD communication system that efficiently processes the allocation and de-allocation of various sized bit rate requests, as well as volume-type requests for more bursty traffic. A BOD communication system is also needed to overcome the other disadvantages of conventional systems described above such as the dynamic use of channels as either data channels or contention channels. A need also exists for a BOD communication system which packs uplink data channels more efficiently to accommodate temporary bit rate requests, that is, volume requests for bursty traffic as well as constant bit rate requests and provide different grades of quality of service. A need also exists for a BOD communication system which generates a plurality of bandwidth allocations to satisfy a bandwidth request on a periodic basis rather than providing a requesting satellite terminal with whatever bandwidth is available at the moment and requiring the satellite terminal to re-request the allocated portion of the bandwidth request.

SUMMARY OF THE INVENTION

The above-mentioned disadvantages of BOD communication systems are overcome and a number of advantages are realized by the satellite communication system of the present invention. A satellite payload operates in conjunction with satellite terminals to dynamically use uplink channels as either contention channels or data channels. The number of contention channels increases as data channel usage decreases, allowing more data channels during peak demands for uplink bandwidth.

In accordance with an aspect of the present invention, the satellite terminals are programmed to transmit rate requests or volume requests to the satellite payload. The satellite payload processes bandwidth requests and assigns slots in uplink frames to satellite terminals via a downlink cell cast.

In accordance with another aspect of the present invention, the satellite terminals are programmed to convert the timeslot allocations received via the satellite to other slot locations in a frame in accordance with one or more numbering schemes. The numbering schemes are selected to spread packets in time as evenly as possible within an uplink frame. Accordingly, the use of a numbering scheme limits jitter, reduces fragmentation and makes defragmentation less complicated. Efficiency of processing on-board the satellite is also increased because the satellite is processing packets in timeslots throughout each uplink frame.

In accordance with yet another aspect of the present invention, the satellite payload queues bandwidth requests and makes partial allocations on a periodic basis until each request is completely satisfied.

A method of transmitting time division multiplexed data from a satellite terminal to a satellite is provided comprising the steps of: (1) providing the satellite terminal with at least one command regarding when the satellite terminal is to transmit data during a frame comprising a plurality of timeslots in a selected sequential order, the command indicating at least one of the timeslots in accordance with a timeslot reordering scheme, the timeslot reordering scheme being selected to reorder the plurality of timeslots in the frame in a nonsequential order; and (2) converting the timeslots in the command to the respective timeslots in the frame in accordance with the selected sequential order. The timeslot reordering scheme is selected to spread data from respective satellite terminals to different timeslots throughout at least one frame.

A bandwidth on demand satellite communication system is also provided comprising: (1) a processor; (2) a plurality of queues connected to the processor, the processor being operable to write to and read from the queues; (3) a receiving device for receiving bandwidth requests from satellite terminals; and (4) a transmitting device for transmitting commands generated via the processor relating to channel allocations to the satellite terminals, the channel allocations corresponding to timeslots in frames transmitted by the satellite terminals, the satellite terminals being configured to receive the channel allocations. The processor is programmed to control the use of each of a plurality of channels for use by the satellite terminals. The channels are each useful as one of a contention channel and a data channel. The contention channels allow the satellite terminals to transmit the bandwidth requests. The data channels allow the satellite terminals to transmit satellite terminal user traffic. The processor stores the bandwidth requests using its queues, allocates slots within the plurality of channels in accordance with the bandwidth requests and a bandwidth allocation algorithm, and transmits the channel allocations via the transmitting device for use by the satellite terminals in a subsequent specified uplink frame. The processor uses the timeslots not allocated to any of the satellite terminals as contention channels such that the number of contention channels changes dynamically, depending on demand for the plurality of channels by the satellite terminals.

The processor uses queues for each channel for storing high and low priority rate requests and high and low priority volume requests, and a bandwidth allocation algorithm for determining the preemption of the queues, and allocation priorities.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

1. Satellite System Overview

Figure 1:
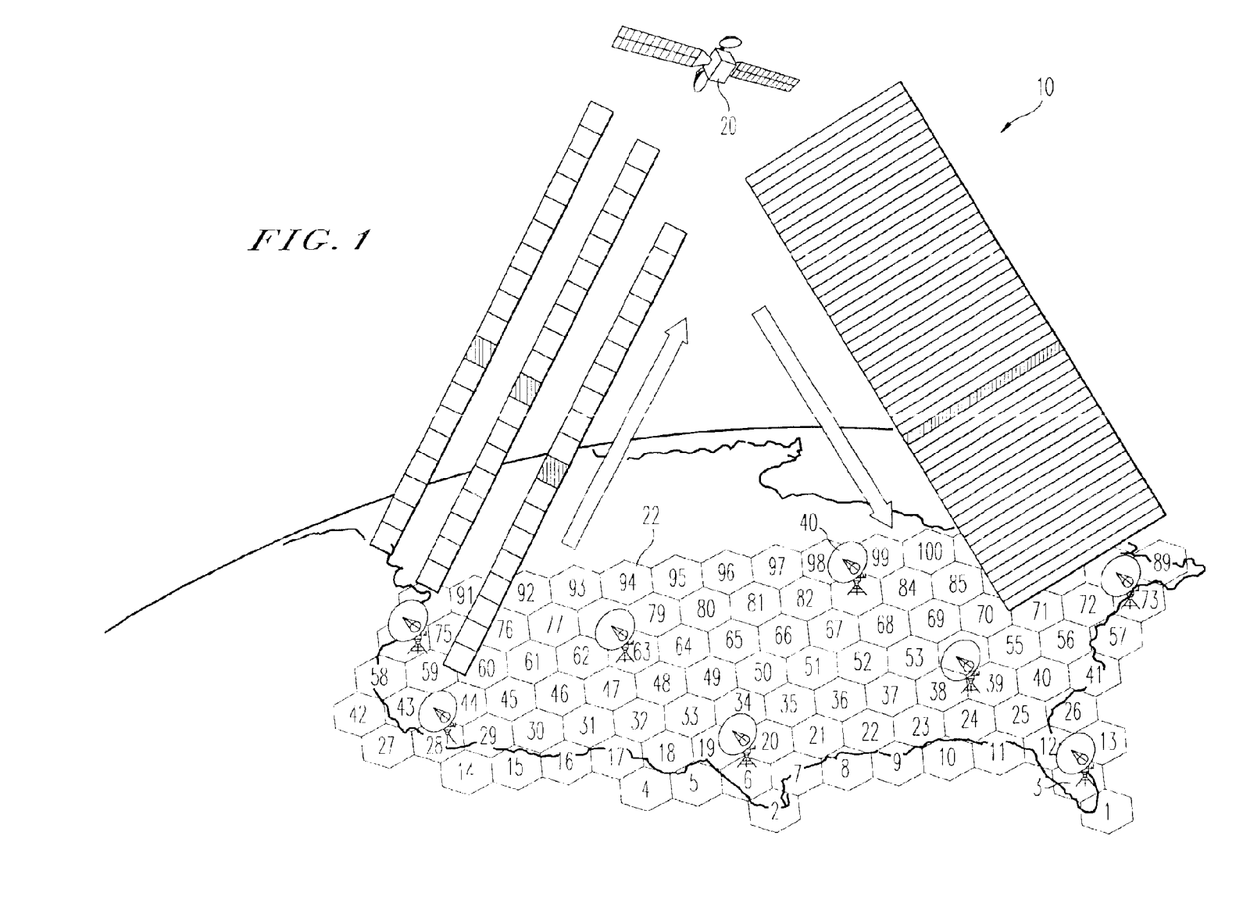
FIG. 1 illustrates the satellite communication system configured for bandwidth on demand, usage of multiple hi-gain spot beams and on-board packet routing in accordance with an embodiment of the present invention.
Figure 2:
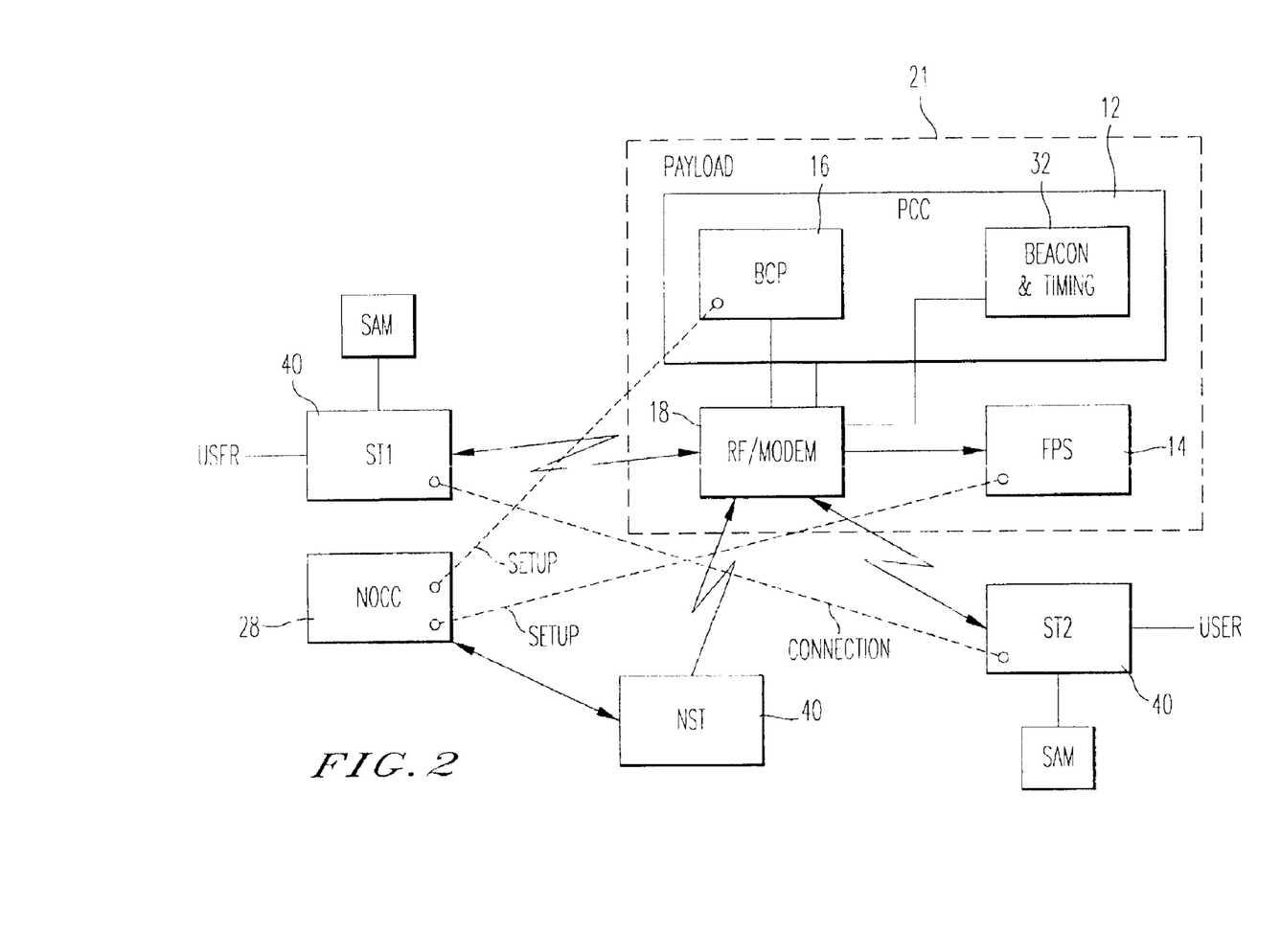
FIG. 2 is a block diagram of a satellite payload and satellite terminals constructed in accordance with an embodiment of the present invention.

With reference to FIG. 1, the broadband multimedia satellite system 10 of the present invention preferably employs one or more geosynchronous orbit (GEO) satellites 20 and offers a wide range of user data rates and services on a bandwidth-on-demand (BOD) basis. The system 10 uses the latest generation of high-power satellites, employing on-board digital signal processing, multiple high-gain spot beams, and on-board packet routing. The broadband multimedia satellite system 10 is preferably capable of supporting a maximum peak capacity of at least 10 Gigabits per second (Gbps) of user data in a point-to-point OTT) transmission mode. Delivery of services to users is provided via low-cost ultra-small-aperture terminals (USATs) hereinafter referred to as satellite terminals (STs) 40. An ST 40 can be an end-user ST or a network ST (NST), as shown in FIG. 2. The broadband multimedia satellite system 10 preferably operates in the 30/20 GHz Ka-band spectrum allocated to Ka-band Fixed Satellite Services (FSS). The system capacity is scalable by either the addition of satellites in adjacent orbital slots, or by adding satellites in the same orbital slot that are operated in a different frequency band to enable future system expansion.

The broadband multimedia satellite system 10 is a packet-based transmission system that enables the offering of bandwidth-on-demand (BOD) connections in support of voice, data, video, and other interactive services and applications such as interactive digital communications and high-speed internet (ES) access. The combination of small terminal size with high throughput makes the broadband multimedia satellite system useful for users ranging from large and medium-sized corporations and other organizations to small businesses, and consumer/SOHO users. Raw data rates supported per single carrier are preferably 16.384 Mbps (8E1), 2.048 Mbps (E1), and 512 kbps (E1/4). A 128 kbps (E1/16) fall-back mode is also provided for terminals experiencing large rain fades and therefore provides for improved availability of lower-end terminal types. Interfaces into terrestrial networks (e.g., the public switched telephone network (PSTN), cellular networks and corporate data networks) allow seamless integration into existing communication system infrastructures.

A network operations control center (NOCC) 28 is provided, as shown in FIG. 2, to perform a number of operations such as validating STs for authorized use of the system 10 resources and to support scheduled connections and BOD traffic. The system 10 also supports connectionless traffic that does not require NOCC involvement to establish the call. For a connection-oriented call, a satellite terminal (ST) communicates with the NOCC to receive tokens with which to request uplink bandwidth from the payload. In this connection mode, the NOCC can determine if sufficient bandwidth is available to meet ST requests therefrom For a connectionless call, an ST communicates with the payload 21 directly without first obtaining authorization from the NOCC using a contention channel request.

A fundamental difference between conventional FSS systems and the broadband multimedia satellite system 10 is the regenerative nature of the broadband multimedia satellite system payload 21 (FIG. 2). In a conventional FSS satellite system, a single beam typically services the satellite coverage area. Information transmitted by a central hub station is received by the satellite and broadcast to all user terminals within the footprint. The user terminals transmit back to their intended destination through the satellite to the hub station. Thus, the satellite simply acts as a repeater. Mesh connections (i.e., user terminal-to-user terminal connections) must always be routed through the hub creating additional latency, due to the double hop required.

Figure 3:
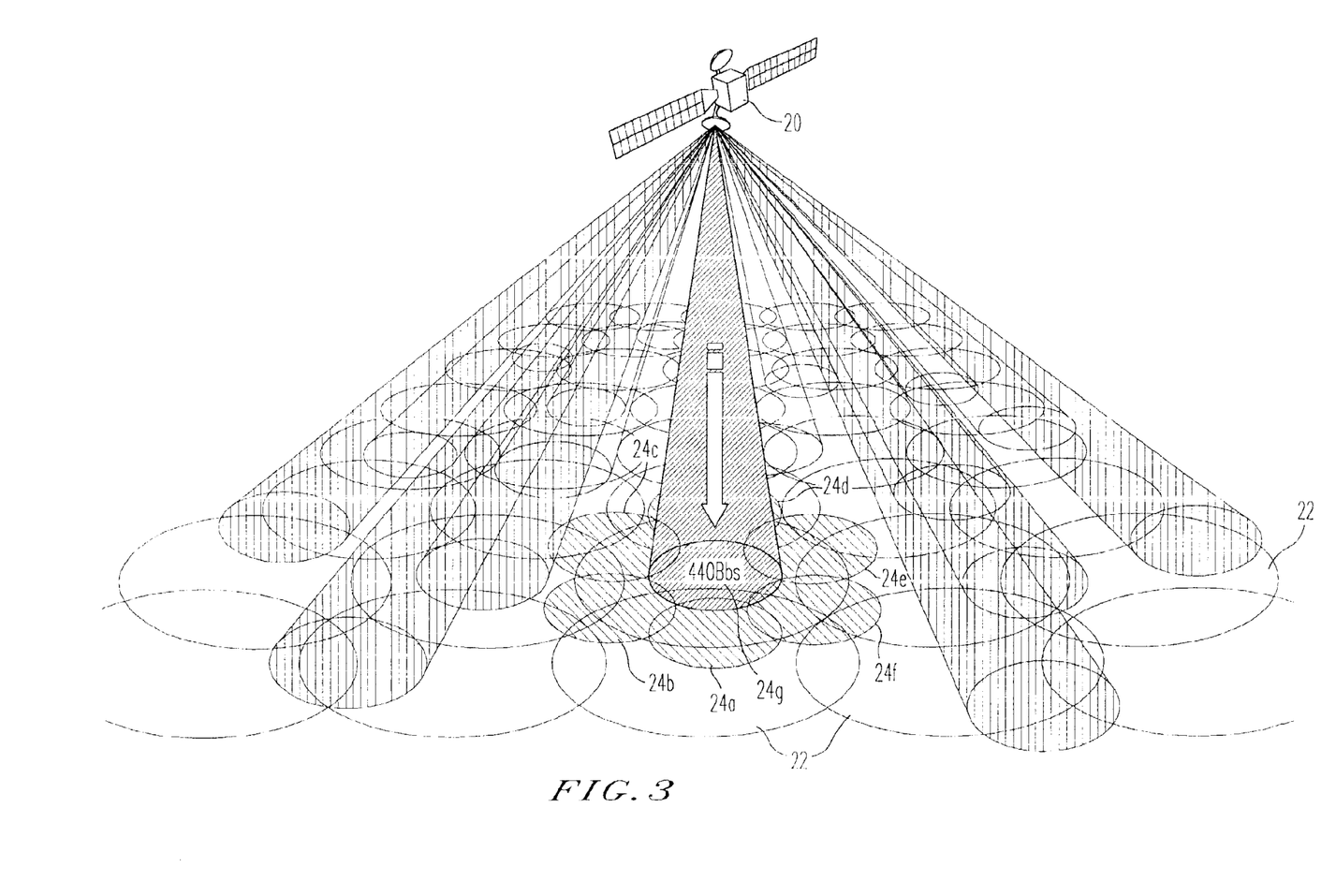
FIG. 3 illustrates uplink beams and downlink beams in a satellite communication system in accordance with an embodiment of the present invention.

In the broadband multimedia satellite system 10 of the present invention, however, the uplink uses approximately 112 spot beams, for example, that provide coverage for uplink cells 22 geographically distributed over the satellite coverage area, as shown in FIG. 1. The system 10 is provided with a satellite payload 21 which can combine inter-beam routing with a broadcast capability. Each uplink cell 22 preferably operates on a fixed polarization with a four-cell reuse pattern to maximize capacity density. The downlink coverage sub-divides each uplink cell 22 into seven microcells 24a through 24g, as shown in FIG. 3. Downlink microcells 24 are capable of operating in either polarization, but operationally are assigned a single polarization, except in areas where there is a high inbound capacity requirement. This enables the satellite 20 to take advantage of the peak gain available in each downlink beam for point-to-point (PTP) transmissions.

Additionally, the satellite 20 differs from conventional satellites in that user data or broadband multimedia packets are processed, and routed by the satellite payload 21. The satellite payload 21 therefore performs a significant amount of the switching and routing responsibilities previously relegated to the network control facility of the central hub station in conventional FSS systems.

A primary transmission function of the broadband multimedia satellite 20 is not to broadcast a received broadband multimedia packet to the entire coverage area. When operating in the PTP mode, the satellite payload 21 of the present invention receives a packet from an uplink cell 22 and routes it only to the downlink cell 24 in which a destination satellite terminal (ST) 40 is located. The payload 21 is also capable of replicating and routing a packet to up to forty multiple downlink cells 24 for point-to-multi-point (PMP) applications. The satellite payload 21 can also support PMP applications without replication. Each ST 40 within a downlink microcell 24 receives all broadband multimedia packets from the payload 21 and only processes those packets addressed to that specific ST 40. For a system 10 operating in North America, for example, each satellite 20 has the capability to transmit broadband multimedia packets to the continental United States (CONUS), Alaska, Hawaii, predefined parts of Canada and selected Latin America cities. There are preferably two CONUS broadcast beams (one for each polarization) that simultaneously cover all or a portion of the satellite coverage area. The system 10 is also configurable to transmit packets to all STs 40 in a cell 22, that is, to cell cast.

The payload 21 on-board the satellite 20 comprises receive antennas for receiving uplink beams (e.g., 106 beams) from various uplink cells 22, and downconverters (e.g., 120 Ka-band downconverters) for downconverting the frequency of the received signals for the processing thereof by a switch matrix (e.g., fast packet switch (FPS) 14). The FPS 14 connects a variable number of demodulators, which are represented by the RF/Modem unit 18 in FIG. 2, to each uplink cell 22 based on demand.

With continued reference to FIG. 2, the payload 21 preferably comprises 5376 E1, or the equivalent thereof, multi-rate demodulators for E1/4, E1 and 8E1 transmissions, for example, in accordance with the present invention. The FPS 14 switches the outputs of the demodulators among variable rate modulators (eg., 24 modulators), which are also represented by the RF/Modem unit 18. The FPS 14 is preferably a 10 gigabits per second (Gbps) asynchronous transfer mode or ATM-type fast packet switch. A payload control computer (PCC) 12 is provided to perform BOD and payload management operations. Ka-band direct input/output (I/O) modulators generate hopping beams (e.g., 442 Mbps hopping beams) that are time division multiplexed with broadcast beams (e.g., two 147 Mbps broadcast beams). The dwell time per downlink cell 24 is dynamically determined based on demand. A bypass configuration is provided to allow the use of the satellite 20 as a bent-pipe transponder with coverage that can be adjusted. A transmit antenna is also provided which can generate, for example, 24 beams and is connected to the outputs of the modulators or the bypass circuit.

The broadband multimedia satellite system 10 of the present invention is advantageous because it can achieve high link availability and low packet loss rates. For example, availability that is typically higher than 99.7% is realized, as well as end-to-end packet loss rates typically better than 1 in 106. Another advantage of the broadband multimedia satellite system 10 of the present invention is its ability to dynamically allocate resources to areas with higher demand. The satellite 20 provides for the flexible allocation of demodulator resources on the satellite payload 21 among the uplink cells 22. This flexibility allows the system 10 via the NOCC 28 to have a capacity planning function to adapt to both relatively short term (e.g., hours) and long term capacity requirement variations.

Figure 4:
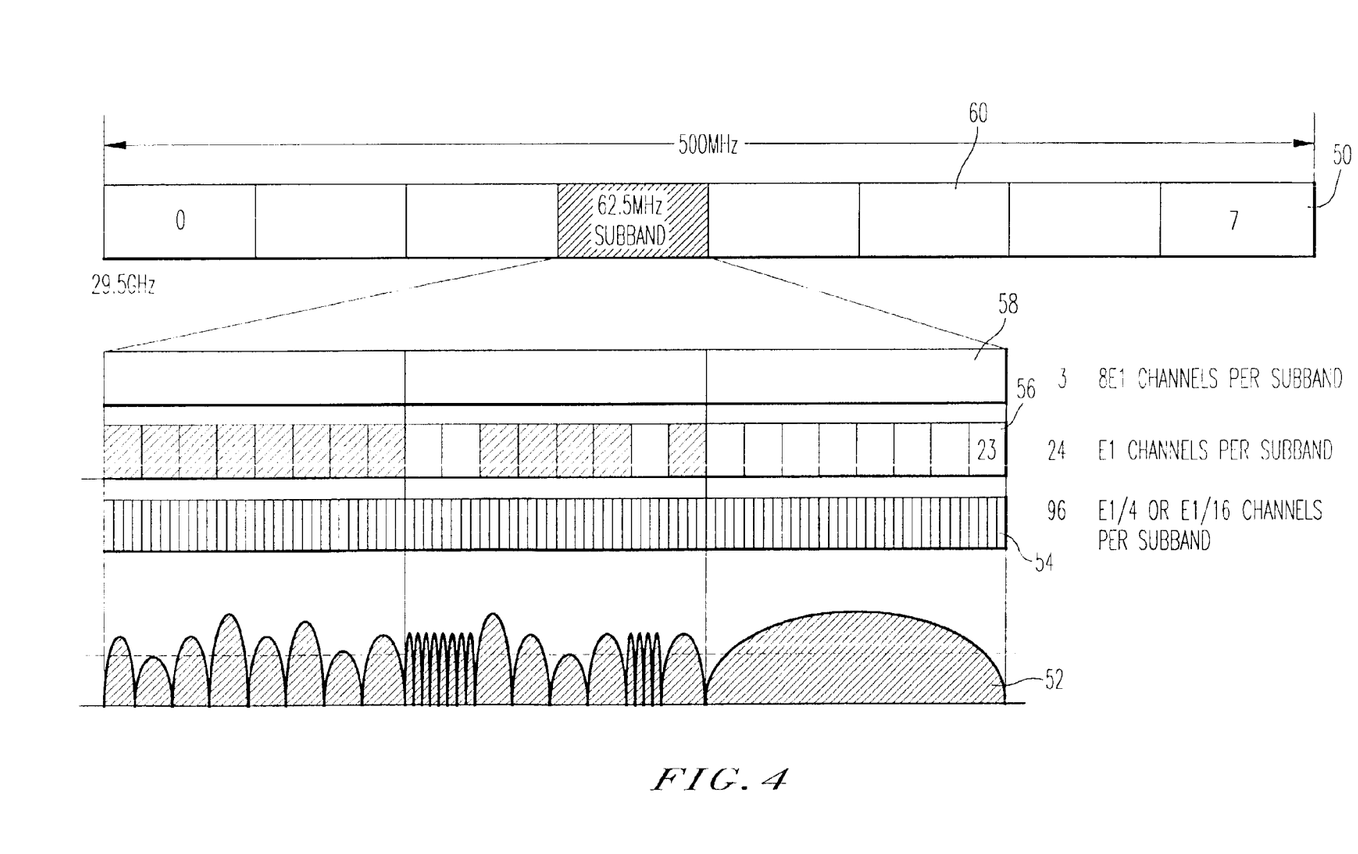
FIG. 4 illustrates uplink channelization in accordance with an embodiment of the present invention.

As shown in FIG. 4, the uplink utilizes an FDMA TDMA signal format with each ST transmitting at an assigned frequency, as indicated at 50, and timeslot, as indicated at 52. The uplink user data packets use one of three-supported burst modes such as 521 kilo-symbols per second (ksps), 2.08 mega-symbols per second (Msps), or 16.67 Msps channels, as indicated at 54, 56 and 58, respectively. A total of preferably 16 sub-bands per satellite 20 are used with eight sub-bands 60 per polarization as indicated at 50. One or more sub-bands 60 can be allocated to each uplink cell 22. A sub-band 60 preferably accommodates the transmission capacity 24 E1 channels 56 or three 16.67 Msps channels 58 or 96 E1/4 channels 54, depending on the burst mode. All sub-bands allocated to a particular uplink cell 22 have the same polarization; therefore, STs 40 in that cell 22 are configured for the same polarization. Between zero and eight sub-bands 60 are allocated to each uplink cell 22 per satellite 20 based on traffic expectations from STs in that cell. The maximum capacity that can be allocated to a given uplink cell 22, therefore, is preferably eight sub-bands 60, which corresponds to 192 E1 channels. To avoid interference, a given sub-band is not allocated to geographically adjacent uplink cells 22.

Three basic downlink transmission modes are supported in accordance with the present invention. A point-to-point (PTP) mode provides mesh connectivity between the STs 40. The broadcast mode (e.g., a CONUS broadcast mode) is used to broadcast information to STs 40 located within a selected geographic area such as the CONUS. The beacon mode is used for system synchronization. Other uses for the PTP mode include multicast or packet replication and transmission to as many as 40 locations, and cell cast (i.e., packet broadcast to groups of seven downlink cells 24 or an uplink cell 22. The broadband multimedia satellite downlink architecture has the capability of flexibly allocating the total system capacity between PTP and CONUS broadcast capacity. The capacity division between the PTP mode and the broadcast mode is adjusted by changing the percentage of time the downlink is in the PTP mode versus the broadcast mode.

With reference to the beacon and timing block 32 in FIG. 2, the beacon mode facilitates system synchronization by transmitting a ⅓ rate binary phase shift keying (BPSK) pseudo random noise (PRN) sequence once per 3 ms downlink frame using one of the downlink slots. The beacon uses a beam pattern designed to fit the entire coverage area of the system 10.

Each downlink frame is preferably 3 milliseconds (ms) divided into 138 slots that are shared between PTP, CONUS, and beacon transmissions. Transmission rates for the PTP and CONUS beams are 400 Mbps and 133⅓ Mbps respectively. PTP bursts each occupy one slot, while the ⅓ rate CONUS bursts use 3 slots. Thus, the split between PTP and CONUS traffic can be changed in increments of three slots.

The downlink preferably consists of a set of as many as 24 independent and simultaneously moving high rate (400 Mbps) TDM carriers. Each TDM carrier contains the user traffic for a given geographic area The set of 24 TDM carriers can be redirected every downlink slot time (21.73 μs) to service a different downlink cell 24. Alternatively, the available power from the 24 TDM carriers is used to generate one of 2 TDM carriers serving a CONUS broadcast shaped beam and operating in a low rate mode of 133⅓ Mbps (i.e, 400/3 Mbps).

To facilitate BOD access techniques, the broadband multimedia satellite 10 uses packetised transmissions. A broadband multimedia satellite packet undergoes a number of transformations as it is transmitted from an ST 40 through the satellite payload to another ST 40. Within an ST 40, the user data is first segmented into broadband multimedia satellite packets. Sets of multiple broadband multimedia satellite packets, along with forward error correction, access control security signature, and synchronization data, are used to form uplink bursts. The uplink bursts are then transmitted to the satellite 20 at the assigned frequency and timeslot, as described above with reference to FIG. 4.

Upon receiving a burst, the satellite payload 21 decodes the broadband multimedia satellite packets and corrects errors, if necessary. Then, the packets are checked for an access control signature to ensure that it was transmitted from an authorized ST 40. If the burst is valid (i.e., authenticated and error free), the packets are extracted and routed to the appropriate destination. A satellite routing field contained in the header of each packet is used by the payload processor 21 to determine to which downlink cell 24 the packets are routed. The packets are encapsulated into a downlink TDM burst structure and transmitted on the downlink The destination ST 40 processes all downlink packets in the burst addressed to its cell 24 and extracts broadband multimedia satellite packets. The ST examines the addressing information within each packet and determines whether the packet should be processed further. If the packets are addressed to the destination ST, they are reassembled back into a packet of user data and forwarded to the user application.

With reference to the beacon and timing unit 32, system synchronization is maintained using the satellite beacon in conjunction with time of day (TOD) messages broadcast periodically by the spacecraft. The beacon allows both time and frequency synchronization between the STs 40 and satellite payload 21. Frequency alignment between the ST 40 and satellite payload (reference) is derived in the ST 40 from the recovered PN clock. Timing is generated from the 1.56 second beacon epoch. TOD is maintained on-board the satellite 20, and the satellite distributes this message to all downlink microcells 24 in the first half of the beacon epoch. At the epoch boundary, each ST 40 updates its time of day with the new value.

Broadband multimedia satellite terminals (nodes) utilize the appropriate type of carrier to support the data rate requirements of the application. Through commands by the NOCC 28, the satellite 20 can be configured to support the desired burst mode on each uplink 22. The exact configuration and amount of resources depends on the business environment and is re-configurable as the business conditions dictate. Except for receive-only terminals, at a minimum, all STs 40 preferably support the 521 ksps burst mode.

As stated previously, the system 10 of the present invention supports connectionless and connection-oriented calls.

For a connection-oriented call, an ST 40 communicates with the NOCC 28 to receive tokens with which to request uplink bandwidth from the payload. In this connection mode, the NOCC 28 can determine if sufficient bandwidth is available to meet ST requests therefrom For a connectionless call, an ST 40 communicates with the payload 21 directly without first obtaining authorization from the NOCC 28. The ST first sends an contention channel request to the payload for uplink bandwidth. The payload PCC 12 in turn sends an allocation to the ST, as well as a power measurement to allow the ST to adjust uplink power. The payload 21 receives packet segments from the ST, validates signatures provided therein, schedules packets for downlink transmission and then transmits them.'

2. Uplink Frame Structure

Figure 5:
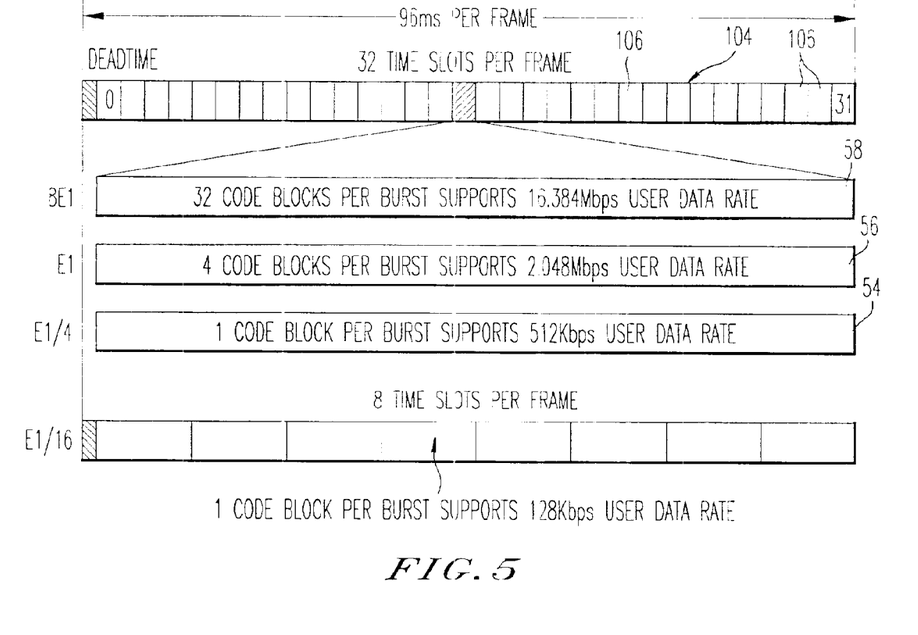
FIG. 5 illustrates an uplink frame in system timing in accordance with an embodiment of the present invention.

As stated previously in connection with FIG. 4, the uplink frame structure for the three rates of data channels (i.e., 512 kbps, 2 Mbps, and 16 Mbps channels 54, 56 and 58, respectively) preferably consists of a 96 ms frame 104 with 32 slots 106 of 3 ms each, as shown in FIG. 5. The fall-back mode discussed above employs eight slots per frame for 128 kbps channels, for example. STs can send 3 ms bursts of packets into each timeslot on each channel to be processed by the satellite payload 21. The number of packets within a timeslot varies by rate. For example, a 3 ms burst contains two packets on a 512 kbps channel, eight packets on a 2 Mbps channel, and 64 packets on a 16 Mbps channel. The present invention is described below with reference to the 512 kbps (¼ E1) rate uplink. It is to be understood that the designs for the 2 Mbps (E1) and 16 Mbps (8E1) uplinks are the same.

Figure 6:
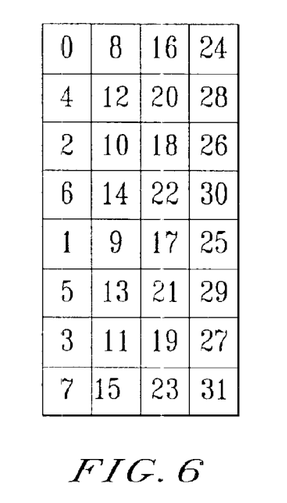
FIGS. 6, 7, 8 and 9 illustrates a timeslot numbering scheme for uplink frames in accordance with an embodiment of the present invention.
Figure 7:
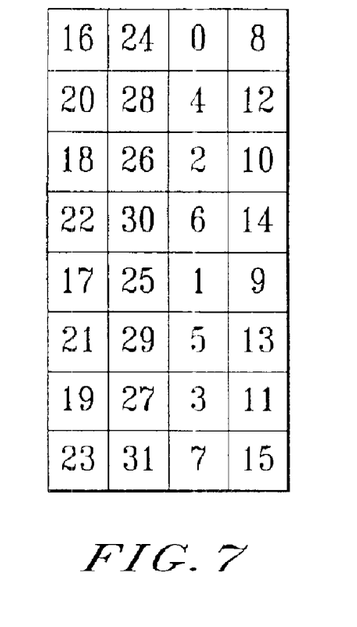
Figure 8:
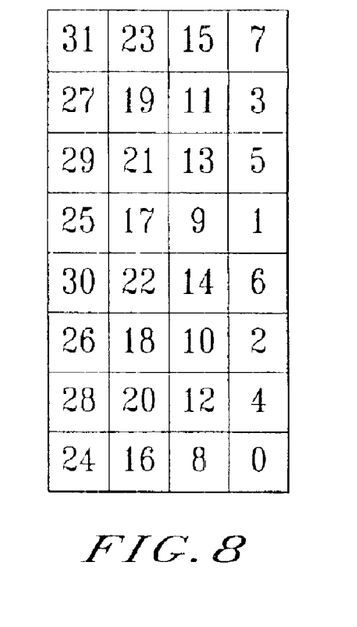
Figure 9:
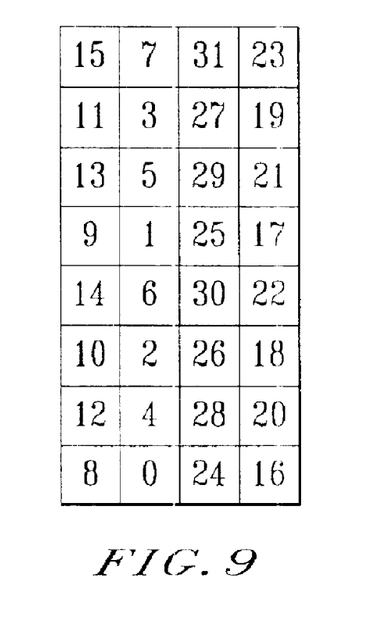

For data channels, the numbering of the slot locations in accordance with the present invention is preferably as illustrated in FIG. 6. The frame is depicted for illustrative purposes as a matrix of 8 rows of 4 slots each. The slots in a row are consecutive in time, as are the respective rows. This numbering scheme allows spreading of the slots 106 within a frame 104 more evenly in time for less than full rate users, thereby mitigating jitter and smoothing traffic across uplink channels. A plurality of different slot numbering patterns can be used to spread the traffic load evenly across the channels, as illustrated in FIGS. 7, 8 and 9.

Figure 10:
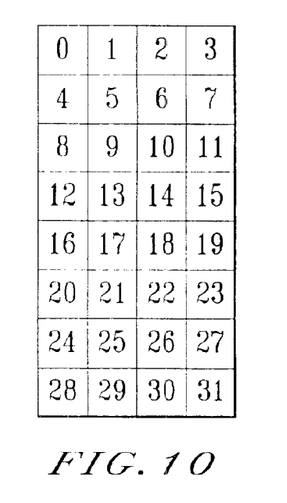
FIG. 10 illustrates numbering of consecutive timeslots in a frame in accordance with an embodiment of the present invention.

The STs 40 are programmed in accordance with the present invention to convert slot numbers that are assigned pursuant to a numbering scheme (e.g., one of the numbering schemes depicted in FIGS. 6–9) to reduce jitter and provide smoothing to consecutively numbered slots, as shown in FIG. 10. Such conversion permits packets sent using the assigned slots to arrive at the destination ST in the correct order. For example, if an ST 40 is assigned slots 0 through 3, the ST transmits its packets in slots 0, 8, 16 and 24 per the numbering scheme depicted in FIG. 10. Accordingly, the transmitted slots are distributed throughout the frame 104. The use of the number scheme allows for more simple commands to the originating ST as to those slots it is to use. In other words, it is more simple to say that an ST can use the first consecutive four slots per the scheme in FIG. 6 than to provide each slot number (i.e., slots 0, 8, 16 and 24) in a slot allocation command. The slot numbering scheme is also advantageous because it prevents the uneven use of slot numbers across all channels for a frame, thereby promoting the processing of packets by the satellite substantially throughout the frame period, regardless of the traffic load or type. Without the use of such a numbering scheme, the first part of each frame period (i.e., slots 0–15) may be used more often than the slots during the later part of a frame period.

To smooth traffic across all channels during a 96 ms frame, four different numbering schemes (e.g., FIGS. 6–9)

are used, for example. Each channel is assigned one of the four patterns by the NOCC 28 when the channel is configured. The NOCC 28 can assign the patterns to the channels such that, on average, the number of packets transmitted in any 3 ms timeslot of the uplink frame is appoximately equal to the number of packets transmitted in any other 3 ns slot of frame. The NOCC, therefore, assigns one-fourth of the 16 Mbps channels to each pattern, one-fourth of the 2 Mbps channels to each pattern, and so on.

3. Uplink Beams and Channels

The satellite 20 has a plurality of uplink demodulators (e.g., 224 demodulators), as described above with reference to the RF/modem unit 18 of FIG. 2. Each uplink demodulator preferably supports the equivalent of three 16 Mbps channels 58. Each 16 Mbps channel can be configured as a single 16 Mbps channel 58 or eight 2 Mbps channels 56, as shown in FIG. 4. If configured for eight 2 Mbps channels, each of those can be configured as a single 2 Mbps channel 56 or four 512 Kbps channels 54. Thus, the capacity of the satellite is 21,504 channels if all are configured as 512 Kbps channels 54. An uplink beam 22 preferably requires a minimum of one uplink demodulator. For bandwidth control purposes, the set of channels processed by one demodulator in an uplink beam 22 is preferably considered.

Two types of uplink channels are preferably used in the system 10, that is, contention channels and data channels. A channel is configured as either a contention channel or a data channel at any one time and not both at the same time. In other words, uplink channels preferably operate in one of two modes, that is, as a contention channel or a reserved channel. The satellite payload 21 sends information packets by multicast to every ST in each uplink beam to describe the uplink channel configuration, including which channels are contention channels and which channels are reserved channels. The contention channels preferably operate at the 512 kbps rate.

When an ST uses a contention channel, the ST sends a 3 ms, two-packet burst into a random timeslot on the channel, for example. If no other ST sends a burst to the same channel and timeslot, the satellite payload 21 is able to process and deliver the packets in the burst. If two or more STs transmit packets on the same channel and timeslot and a collision occurs, the payload 21 can process and deliver one burst, while the other burst is lost. It is also possible that the payload 21 is not able to process and deliver either burst. STs do not receive direct confirmation from the satellite payload 21 that it has processed a contention channel burst or that the burst has been lost. STs determine that data sent to a contention channel has been processed by waiting for a response from the satellite payload 21, ST or end user to which the packets were addressed.

STs can use contention channels either for control purposes to send packets to the PCC 12 or a system ST (SST) at the NOCC 28, or, if authorized, for communication purposes to send user data packets to another ST. Some 512 kbps channels can be allocated for data packet contention use only, and other 512 kbps channels can be allocated for either control or data contention bursts.

Contention channels are also used by the ST 40 for bandwidth allocation requests to the BCP 14 in the satellite 20. Bandwidth allocations are made periodically by the BCP 14 based on the requests on its queues. After making its allocations, the BCP transfers any totally unallocated data channels to contention channels. Allocations are packed into a downlink multicast to all ST 40 in an uplink beam, for example. This multicast or cell cast also indicates any additional contention channels (in addition to configured contention channels) available to the ST 40 in the beam 22 for a specified frame. The NOCC 28 preferably configures all channels within all demodulators in all uplink beams as follows: (1) configures uplink rate; (2) configures the slot numbering scheme; and (3) configures the use of each channel (e.g., supervisory contention, BOD contention, data contention, data, or not available).

Assuming the demodulator servicing an uplink beam 22 is configured as 96 channels 58 of rate 512 Kbps, the uplink channels within the beam 22 are used as follows. First, the highest numbered channels are configured as a selected number of contention channels. Data channels preferably start at the lowest numbered channel. All channels except the configured contention channels are available for BOD allocation. Bandwidth allocations or allocations are made by starting with the first data channel. Any unallocated data channels are transferred to temporary (i.e., temporary for one frame) contention channels.

In accordance with frequency reuse rules employed in the system 10, STs transmit data at near optimal power levels for a given atmospheric degradation. An uplink power control algorithm (ULPC) is employed by the STs and the satellite payload 21 whereby STs receive feedback from the satellite to perform a closed loop type of power control. When STs first request bandwidth, they are provided with an initial condition for the control loop, which may not be accurate, to determine the initial power for transmission. The bandwidth requests are sent via a contention channel. The ULPC algorithm provides different performance on the contention channels than on the rate and volume channels. To address uplink power inaccuracies, frequency use constraints are preferably used on content channels. The type of interference that is a concern occurs when an ST sending data on a contention channel transmits at high power and interferes with an ST sending data at an appropriate power level. By placing the contention channels of nearby isolated cells to be cofrequency, additional interference that may occur due to content channels does not impact rate and volume traffic performance.

4. Rate Requests

Rate requests specify the number of slots 106 in each uplink frame 104 that an ST 40 requires to meet the uplink demands for its connection-oriented traffic. A Rate request results in the allocation of a preferably constant number of slots each frame, which are distributed as evenly in time as possible, that the ST can use to send packets at a constant rate. Each frame preferably has a maximum of 32 slots (FIG. 5). A Rate request specifies from 1 to 32 slots per frame. A full 16 Mbps, 2 Mbps, or 512 Kbps user requests all 32 slots. An 8 Mbps, 1 Mbps, or 256 Kbps user requests 16 slots per frame and so on. The requesting ST gets a constant allocation of that uplink capacity every frame until the request is cancelled by the ST via a do allocation message to the satellite. Sending rate allocations every frame permits the PCC 12 to move rate allocation slots within a channel or to another channel to perform de-fragmentation of rate allocations. A Rate request has the following information at a minimum: (1) an ST source address (e.g., ST source ID and uplink beam ID); (2) the type of request (i.e., Rate request); (3) the number of slots 106 per frame 104 required; (4) the channel rate (e.g., specify 512 kbps, 2.048 Mbps or 16.384 Mbps or channel, slots, and so on) already on queue (if any); (5) the priority of the request; and (6) security information.

Rate requests are placed on data channels Q1 or Q2 within the memory of BCP memory 16. The requesting ST 40 receives a periodic allocation (or allocation) which specifies the channel, start location, and number of slots. An ST 40 is assigned the same channel and start location on each allocation unless it is notified of a change in channel and/or location. Changes are necessary when a ST makes an additional request Rate or Volume) and is moved to a new channel and/or location or during realignment for de-fragmentation.

Rate requests are queued to the first data channel until its capacity is filled, then to the second data channel, and so on. Rate requests are packed in this manner to allow data channels with no Rate allocations and no Volume allocations to be transferred to contention channels.

Initial bandwidth requests for a Rate allocation are preferably only sent on a contention channel; however, the message to de-allocate a Rate request can be, and is preferably sent within the Rate allocation being de-allocated. Rate requests are acknowledged by the BCP 16 in one of two ways, that is, a Rate allocated message or a Rate denied message. Rate release (or de-allocate) messages from the ST 40 are acknowledged by the satellite 20. If the ST does not get a response to a Rate request or Rate release within a selected period of time, it resends the message. If an ST receives a request denied response to a Rate request, it retries no earlier than until a selected period of time has elapsed. Rate requests preferably must be deallocated (released) by the ST when it is no longer needed.

Rate requests can be increased or decreased by sending another Rate request specifying a different number of slots per frame. This new request is sent using an allocation from the original Rate request. If the request can be granted, the ST receives an accepted message; otherwise, the ST receives a denial message. The BCP 16 does not de-allocate the original Rate request until it has successfully processed the new Rate request.

An ST that has a rain fade, or otherwise does not receive the cell cast message with the allocations, waits until it receives the next cell cast which specifies its allocation to start sending. An ST falling back or going forward to a channel with a different channel rate uses an original rate request, even if the ST already has an active rate on queue for another channel rate. The BCP 16 discards the queued rate when the fallback rate request is received.

5. Volume Requests

Volume requests specify the number of uplink slots an ST requires to send a specific number of packets to another ST. The requesting ST receives a period allocation of one or many slots within a specific frame until the entire number of slots requested has been allocated. The system 10 of the present invention acknowledges that there is some maximum total of uplink bandwidth used for Rate allocations at any one time, and that a portion of the total uplink bandwidth in an uplink beam is available for Volume allocations for bursty packet-type traffic. A Volume allocation is used by an ST 40 to send one or many packets of data on the uplink in a single occurrence, although several such slot allocations may occur in a short period of time to send a file consisting of hundreds of packets (e.g., IP frames segmented into packets).

A Volume request has the following information at minimum: (1) an ST source address; (2) type of request (i.e., Volume request); (3) the priority of the request (i.e., high or low); (4) the number of slots requested; (5) the channel rate; (6) and an indication of whether this is a follow-up request to send additional packets received since the previous request.

An ST can use Volume requests to send large amounts of data on the uplink and, by the use of follow-up requests, almost continuously send data for a long period of time. For example, initial Volume requests for uplink bandwidth are made by sending a message on the uplink on a contention channel for a number of slots required to transmit packets. If the ST receives additional data before the initial request has been completely metered out, a "follow-up" volume request is made by sending an inband message using a slot allocation of the previous request. The follow-up request is for the number of slots required for packets for which a request has not been made, including the packet for the data displaced by the follow-up request. The ST 40 is provided with a follow-up request timer of greater duration than an initial contention request timer also provided therein. The follow-up request timer is preferably equal to the allocation timer discussed below. During periods where the uplink beam 22 is oversubscribed and there are a number of slots (i.e., a number greater than or equal to a configured threshold) already on queue for all data channels, the BCP 16 discards all follow-up requests. A bit within the request indicates whether the request is a follow-up request.

In response to a Volume request, the BCP 16 either sends an allocation or sends an acknowledgement in an multicast allocation or acknowledgement packet, respectively, to the requesting ST within preferably a selected number of milliseconds. If no response is received within this amount of time, the ST 40 can re-request on a contention channel. An additional backoff algorithm is provided which increases the random time to send a re-request, based upon the number of times it has been attempted to minimize the likelihood chance of another collision.

Acknowledgements are used to insure that the ST 40 receives a response, if the request is accepted, within a selected number of milliseconds to reduce the number of re-requests on the contention channels. No acknowledgement is made for follow-up requests since the ST uses the allocation timer value for follow-up requests and assumes it was received unless that timer expires.

An ST 40 receiving either an acknowledgement or the first allocation of a multi-allocation cancels its response timer and sets an allocation timer. This timer is restarted when each allocation is received. If it expires, the ST 40 sends a new request on a contention channel.

For volume requests, only one active request and one follow-up request is preferably allowed in the BCP 16 at any one time per priority or destination. Two request IDs are available per request priority and as many as 126 different destinations, for example. An ST can then send an original volume request using one of the request IDs, send a follow-up request using the other request ID, and continue sending follow-up requests using alternate ones of the request IDs until all of its data is transmitted.

The BCP 16 in the satellite 20 places Volume requests on either the low or high priority Volume queue. Volume requests remain on queue within the satellite 20 until the bandwidth requested has been allocated completely or after a configured time-out (e.g., using an allocation timer).

The total number of Volume request entries on a channel's low and high priority Volume queues varies based upon the total capacity available for Volume allocations, the number slots in each Volume request on queue, and latency requirements. The maximum number of requests on queue is configurable.

Volume requests are spread evenly among the available data channels, that is, the first request is queued to the first available channel, the second request to the next available channel, and so on. Thus, if there are ten available channels, and ten volume requests are received within the same timeframe, then theoretically one request is queued to each channel. The requests are essentially queued to channels on a round-robin basis.

Fairness is maintained among competing STs attempting to acquire uplink bandwidth in a number of ways. For example, a contention channel for original Volume requests is used so that each ST has an essentially equal chance of success. During periods of moderately heavy traffic, follow-up requests from STS 40 are discarded. This provides other STS 40 using the contention channel a better chance of a successful request. The ST, whose follow-up request has been discarded, does not send another request on the contention channel until its allocation timer expires.

During periods of extremely heavy traffic (e.g., all queues at maximum), the BCP 16 controls the number of re-requests on the contention channel by sending an acknowledgement to requests received on the contention channel, and then by discarding the request. The STs 40 do not make a re-request until the allocation timer expires.

6. ST Contention Channel Usage

An ST making a bandwidth request (Rate or Volume) on a contention channel performs operations which will now be described. If the ST did not receive the BCP 16 cell cast allocation message for the next frame (i.e., it is not aware of additional contention channels), the ST randomizes its bandwidth request over the number of slot locations specified by the configured contention channels only. If this is one channel (i.e. the highest numbered channel in an uplink beam), then the ST picks a slot location from among the 32 slot locations in that channel. If the ST has received a BCP cell cast indicating temporary additional contention channels for the next frame, it randomizes a BOD request over the total slots in the configured and temporary contention channels.

7. Satellite Request Queues

As discussed above, the satellite has a set of queues for bandwidth requests. Each uplink channel, except for configured contention channels, preferably has four queues. A Q1 queue is provided for high priority Rate requests. The total of Q1 requests on queue cannot exceed the capacity of the channel. Thus, one 512 Kbps user, two 256 Kbps users, and so on, can be on this queue. These requests get an allocation every frame equal to the number of slots per frame in the Rate request. Requests on this queue are not preempted by any other request.

A Q2 queue is provided for low priority rate requests. The total of Q1 and Q2 on queue cannot exceed the capacity of the channel. These requests get an allocation every frame equal to the number of slots per frame in the Rate request. Requests on queue Q2 can be preempted by a new high priority Rate request and removed from the queue and either discarded or moved to another channel's Q2 queue.

A Q3 queue is provided for Volume requests of high priority packet traffic. A request is for N number of slots. These requests are processed using whatever bandwidth is left over for the channel after the Q1 and Q2 requests have been allocated. Requests are not queued to Q3 if the total of Q1 and Q2 equals the maximum capacity of the channel. A Q4 queue is provided for volume requests of low priority packet traffic. A request is for N number of slots. These requests are processed using whatever bandwidth is left over for the channel after the Q1, Q2, and Q3 requests have been allocated. Requests are not queued to Q4 if the total of Q1 and Q2 equals the maximum capacity of the channel. A minimum bandwidth for Q4 can be configured such that Q4 is processed before Q3 once every N frames. For example, if a minimum bandwidth of 5% of Q4 is desired, then Q4 is processed first every twenty frames.

8. Bandwidth Control Processor (BCP) Uplink Allocation Algorithm

The BCP 16 in the satellite 20 makes Rate and Volume allocations a selected number of times each frame (e.g., once per frame). The BCP makes bandwidth allocations for the fourth frame in the future to allow for downlink queuing and space delay to the ST 40. The STs 40 are allocated the bandwidth required in the requests on queue. The total of the bandwidth required for Rate requests on a channel's Q1 and Q2 queue can equal, but does not exceed, the capacity of a frame for that channel.

The BCP 16 processing of Volume requests on Q3 and Q4, if any, will now be described. Queues Q3 and Q4 are round robin queues, that is, requests on these queues each get an equal chance to be allocated bandwidth. Each time the BCP 16 makes a bandwidth allocation for a request on queue Q3 or Q4, the BCP moves to the next request on queue for the next allocation, and so on. The BCP starts with the queue Q3 and only processes the queue Q4 if there is available bandwidth and no entries on the queue Q3 unless a minimum bandwidth is configured for Q4, in which case Q4 is first processed. The BCP attempts to allocate the entire unallocated portion of a frame (i.e., a maximum of 32 slots) to the next ST on the queues Q3 or Q4 (i.e., queue Q3 is not used). If the ST's request is equal to, or more than, the number of unallocated slots in the channel, the ST is assigned all unallocated slots; otherwise it is allocated less slots. If the ST is not allocated all unallocated slots, the second ST on queue is allocated bandwidth, and so on, until all the slots are allocated or there are no more requests. The BCP decrements the number of slots allocated from the number requested for the ST or ST's that were allocated slots and moves its pointer to the next ST on queue when processing resumes. If an ST's allocation depletes the requested slots, the request is removed from the queue and discarded. Each Volume request on queue has a time stamp of the last time the request received an allocation. It this time exceeds the allocation timer value used by the ST the request is discarded.

9. Downlink Cells and BCP Cell cast Messages

The BCP 16 merges all the allocations for an uplink beam 22 into one or more packets and uses a cell cast to the center sub-cell of the downlink cell 24 which corresponds to the uplink beam 22 to send the slot allocations to the ST 40 in the beam 22. Each uplink beam 22 has a corresponding downlink cell 24 consisting of 7 sub-cells 24a through 24g. A downlink burst is, by way of an example, equal to one slot of twelve packets. At some interval, the downlink process takes twelve packets, or fewer packets if there are not twelve packets on queue, from a downlink cell's queue, points to the center sub-cell 24 and transmits the cell cast burst to each sub-cell in an uplink beam.

The BCP 16 in the satellite 20 transmits different information every frame in a cell cast message to all STs 40 within an uplink beam 22 that are also in the same downlink cell 24a, 24b, 24c, 24d, 24e, 24f or 24g. For example, the information in every frame preferably includes: (1) rate allocation or denial messages in response to Rate requests; (2) acknowledgements to Volume requests received via contention channels; (3) slot allocations, in response to Rate and Volume requests, for a specified frame in the future; and (4) the number and carrier of the temporary additional contention channels available for a specified frame in the future. The cell cast information described above is packed into one downlink packet, or multiple packets if necessary, and sent via a cell cast address to be received by all the ST 40 within a downlink cell.

10. BCP Allocations

The BCP packs all allocations destined for the ST that have allocations in the same downlink beam 24 into one or more cell cast messages. The common portion of the message contains the uplink frame for which the allocations apply and other information used by all STs 40. The allocation portion of the message preferably has three sections, that is, temporary contention channels, Rate allocations, and Volume allocations.

The Rate allocation section contains individual allocations with preferably the following information: (1) uplink channel; (2) slot start location within the frame (i.e., one of slots 0–31); (3) the number of contiguous slots less 1; (4) priority; and (5) slot numbering pattern. The volume allocation section contains individual allocations with preferably the following information: (1) ST source address; (2) uplink channel; (3) burst start location (i.e., one of slots 0–31); (4) the number of contiguous slots minus 1; (5) an indication of whether it is the last allocation of request; (6) priority (i.e., high or low); and (7) slot numbering pattern.

11. Broadcast Message Protocol

BOD requires that the ST 40 and the satellite 20 have a message exchange and event timers to stay synchronized. The protocol for Rate request will now be described. First, the ST 40 sends a Rate request on a contention channel and starts its response timer. If the satellite 20 receives the request, it sends either an accepted or denied response. If the ST 40 receives an accepted response, the Rate is on queue in the satellite 20. If the ST 40 receives a denied response from the satellite 20, the ST starts its 750 ms re-request timer and sends another Rate request when the re-request timer expires. If the ST response timer expires, the ST sends another Rate request immediately and starts its response timer.

The protocol for Rate de-allocations will now be described. The ST 40 sends a Rate de-allocation message, using the latest allocation received for the Rate, and starts its response timer. If the satellite 20 receives the message, the satellite sends a de-allocated response. If the ST 40 does not receive a de-allocated message, its response timer expires and it sends another Rate de-allocation message to the satellite, using the latest allocation received for the Rate. The ST also starts its response timer.

The protocol for Volume requests will now be described. The ST sends a Volume request on a contention channel and starts its response timer. If the satellite 20 receives and accepts the request it sends either an acknowledgement or an allocation to the ST. If the ST 40 receives the acknowledgement or allocation, and the allocation was not for the total slots requested, the ST starts its allocation timer. If the ST receives neither an acknowledgement nor an allocation before its response timer expires, it sends another Volume request and starts its response timer. Each time the ST receives an allocation for its request, and it is not the last allocation of the request, it restarts its allocation timer. If the allocation timer expires and the ST has more packets to send, the ST sends another Volume request on a contention channel and starts its response timer. When the ST receives its last allocation of a request and it has more packets to send, it uses one of the slots in the allocation to send a follow-up request for additional slots and starts its allocation timer.

12. Uplink Frame Fragmentation

The BCP 16 looks upon a frame as 32 consecutive slots. As stated previously, a slot numbering scheme is preferably used as described with reference to FIGS. 6–9. Thus, when assigning the Rate requests for a channel, the BCP gives the first request on queue the first consecutive slots in a frame starting with slot 0. The second Rate request on queue is assigned consecutive slots starting from the last slot of the first request, and so on, until all Rate requests are assigned. The BCP performs a similar process with volume requests. The first volume request on queue is given as many of the 32 consecutive slots in the frame being allocated as are available and it can use, then the next volume request on queue is assigned the next consecutive slots, and so on. This almost completely eliminates the need to perform de-fragmentation on a frame. A channel with four 128 K Rate allocations is automatically de-fragmented when any request is released (i.e., de-allocated), and the remaining Rate requests are allocated when the allocations are made for the next frame.

13. Bandwidth Allocations

The Bandwidth Control (BC) Algorithm makes allocations once per frame for the uplink frame that is approximately 2½ frames in the future. It processes each uplink beam and makes allocations for requests on queue in the following sequence: (1) Rate Allocations; (2) High Priority Volume Allocations; and (3) Low Priority Volume Allocations.

The BCP 16 lookahead for volume allocations is one frame rather than allocating several frames in advance, say 10 frames. In an oversubscribed uplink, no matter how many advance frames are used, the result is at most one available unallocated frame at any one time. The first request received gets allocated all 10 frames in the lookahead. If in the next frame another request is received, 9 of the 10 lookahead frames have already been allocated in the previous frame. Thus, the second request is only given the tenth frame, and so on. In a fully loaded system, nothing is allocated on a per frame basis other than the farthest frame in the future in the lookahead. Thus, it is advantageous to have small lookahead. A small lookahead interval is easier to manage, and handles priorities better, among other benefits. In this system 10, a two frame lookahead can be used, instead of an optimal one frame lookahead, to limit the allocations on the downlink.

The BCP 16 preferably queues the volume requests and sends out many allocations, instead of giving the requesting ST 40 what is available at that moment, and allowing the ST to re-request for the unallocated portion of the request. Assuming an oversubscribed uplink with one frame to allocate at any point in time, not queuing causes a significant increase in requests since only a small portion of each request can be allocated at the instant the request arrives. This either overburdens the contention channels (i.e., if there are no follow-up requests) or decreases data bandwidth by displacing data with follow-up requests. It is more efficient to queue volume requests, with several others, use a round robin allocation scheme to mete out allocations to everyone on queue, thereby satisfying all ST's with an allocation every 400–500 ms or so until the entire requests are satisfied.

Another advantage of the present invention is the fairness of follow-up requests to ST's making aloha requests when the number of contention channels becomes reduced due to heavy packet load. In an oversubscribed uplink, the BCP 16 attempts to fill the uplink and be fair to competing ST at the same time. The BCP 16 ignores follow-up requests if there are more than a selected number of requests on queue already. The sender of the follow-up request then waits until the allocation timer expires to send a new aloha request.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of transmitting time division multiplexed data from a satellite terminal to a satellite, said method comprising:
   providing said satellite terminal with at least one command that allocates to said satellite terminal a number of timeslots within each of at least one frame for data transmission, said command identifying said number of allocated timeslots in a first order; and
   converting said timeslots identified by said command to corresponding timeslot locations within each frame in a second order in accordance with a timeslot reordering scheme to distribute said allocated timeslots throughout each frame, the second order comprising a non-sequential order within the at least one frame.

2. The method as claimed in claim 1, further comprising selecting said timeslot reordering scheme to distribute data from respective satellite terminals to different timeslots throughout each frame.

3. The method as claimed in claim 1, wherein said converting is performed by said satellite terminal.

4. The method as claimed in claim 1, wherein said providing comprises:
   receiving a request for bandwidth at said satellite from said satellite terminal;
   processing said request to determine an allocation of timeslots within each frame for said satellite terminal to transmit said data;
   generating said command to indicate said timeslots allocated to said satellite terminal in said first order; and
   transmitting said command to said satellite terminal.

5. In a bandwidth on demand communication system, wherein channels correspond to timeslots in frames with some of said channels being designated for bandwidth requests comprising at least rate requests and volume requests, said rate requests each being a request for a selected number of said timeslots in each of said frames and each of said rate requests being characterized as one of high priority of low priority, said volume requests each corresponding to a request for a selected number of said timeslots to send a selected amount of terminal traffic, said terminal traffic comprising at least one of data, audio, or video, and each of said volume requests being characterized as one of high priority or low priority, and wherein said communication system includes terminals that are operable to transmit said bandwidth requests, a processing device for providing channel allocations comprising,
   a first queue and a second queue, said processing device storing said high priority rate requests in said first queue and allocating a selected number of said timeslots in each of said frames to each of said high priority rate requests stored in said first queue, and storing said low priority rate requests in said second queue and allocating a selected number of said timeslots in each of said frames to each of said low priority rate requests stored in said second queue, the sum of the number of said timeslots in each of said frames allocated to said rate requests stored in said first and second queues not exceeding a total number of timeslots in each of said frames, allocation of said timeslots to said rate requests stored in said second queue being preempted for at least one frame by allocation of said timeslots to said rate requests stored in said first queue for said at least one frame; and
   a third queue and a fourth queue, said processing device storing said high priority volume requests in said third queue and storing said low priority volume requests in said fourth queue, said high priority volume requests and said low priority volume requests being preempted for at least one frame by allocation of said timeslots to rate requests stored in said first queue and said rate requests stored in said second queue;
   wherein said processing device is operable to assign said timeslots to as many of said volume requests stored in said third queue and said fourth queue as possible in lieu of providing said terminals requesting said bandwidth all of said channels that are available at that time and to continue to store said volume requests in respective ones of said third queue and said fourth queue until the requests for said bandwidth have been allocated.

6. A method of transmitting channels in a bandwidth on demand communication system wherein channels correspond to timeslots in frames and the system comprises a number of uplink cells within which terminals transmit signals using at least one of said channels, said method comprising:
   controlling the use of each of said channels by said terminals, said terminals being operable to transmit bandwidth requests to send terminal traffic comprising one or more of the categories data, audio or video, said plurality of channels each being useful as one of a contention channel or a data channel, said contention channels allowing said terminals to transmit said bandwidth requests, said data channels allowing said terminals to transmit said terminal traffic, said channels being allocated in accordance with said bandwidth requests and transmitted to said terminals in a subsequent one of said frames, said terminals being operable to adjust power for transmission of said bandwidth requests and said terminal traffic using an initial power condition; and
   transmitting said contention channels in adjacent and isolated ones of said uplink cells as cofrequency channels to reduce interference of said contention channels with said data channels.

7. A method of performing bandwidth allocations, the method comprising:
   receiving a bandwidth request from a terminal over a communication channel, the bandwidth request specifying a desired number of transmission slots of a frame;
   determining allocation of the transmission slots of the frame based upon the received bandwidth request;
   distributing the allocated transmission slots throughout the frame according to a prescribed sequence; and
   selectively sending an allocation command identifying the allocated transmission slots to the terminal based upon the distributing, the allocation command including a slot numbering identifier identifying one of a plurality of slot numbering patterns, wherein the terminal determines actual transmission slots to use based on a number of allocated transmission slots and the slot numbering identifier and wherein the number of allocated transmission slots and the slot numbering identifier do not identify the actual transmission slots to be used by the terminal.

8. The method as claimed in claim 7, wherein the bandwidth request is a rate request of a volume request, the rate request specifying a constant number of transmission slots, the volume request specifying a specific number of transmission slots.

9. The method as claimed in claim 8, further comprising:
receiving a follow-up request from the terminal, the follow-up request being associated with the volume request and specifying and specifying additional desired transmission slots; and
selectively discarding the follow-up request based upon traffic load.

10. A method of performing bandwidth allocations, comprising:
receiving a bandwidth request from a terminal over a communication channel, the bandwidth request specifying a desired number of transmission slots of a frame;
determining allocation of the transmission slots of the frame based upon the received bandwidth request;
distributing the allocated transmission slots throughout the frame according to a prescribed sequence; and
selectively sending an allocation command identifying the allocated transmission slots to the terminal based upon the distributing, wherein the bandwidth request has a time stamp that indicates a time of receipt of a previous allocation command, and the determining includes:
comparing the time stamp with an allocation timer value to determine whether the time stamp exceeds the allocation timer value; and
selectively discarding the bandwidth request based upon the comparing.

11. The method as claimed in claim 8, wherein the bandwidth request is a rate request requesting a first number of transmission slots, the method further comprising:
placing the rate request in a queue;
receiving another bandwidth request that is a rate request associated with a fallback rate, the fallback rate requesting a different number of transmission slots of the frame than the first number of transmission slots; and
discarding the queued rate request.

12. The method as claimed in claim 8, wherein the rate request and the volume request each has two levels of priority.

13. The method as claimed in claim 12, further comprising:
placing the bandwidth request in a queue, the queue being designated as one of a high priority rate request queue, a low priority rate request queue, a high priority volume request queue, or a low priority volume request queue, wherein the rate request queues are of higher priority than the volume request queues.

14. The method as claimed in claim 13, wherein the volume request queues are round robin queues.

15. The method as claimed in claim 13, further comprising:
reserving a minimum number of transmission slots for the low priority volume request queue.

16. The method as claimed in claim 7, the method further comprising:
receiving another bandwidth request from the terminal, the other bandwidth request being received using a previously allocated transmission slot.

17. The method as claimed in claim 7, wherein the frame is a TDMA (Time Division Multiple Access) frame.

18. The method as claimed in claim 7, wherein the communication channel is a data channel or a contention channel.

19. A method of communicating over a satellite communication system, the method comprising:
transmitting a bandwidth request to a satellite over a communication channel, the bandwidth request specifying a desired number of transmission slots of a frame; and
receiving an allocation command from the satellite that is configured to:
determine allocation of the transmission slots of the frame based upon the received bandwidth request,
distribute the allocated transmission slots throughout the frame according to a prescribed sequence, and
transmit an allocation command that includes an identifier identifying one of a plurality of slot numbering patterns, wherein the allocation command does not identify actual transmission slots that will be used.

20. The method as claimed in claim 19, wherein the bandwidth request is a rate request or a volume request, the rate request specifying a constant number of transmission slots, the volume request specifying a specific number of transmission slots.

21. The method as claimed in claim 20, further comprising:
transmitting a follow-up request to the satellite, the follow-up request being associated with the volume request and specifying additional desired transmission slots, wherein the satellite selectively discards the follow-up request based upon traffic load.

22. A method of communication over a satellite communication system, the method comprising:
transmitting a bandwidth request to a satellite over a communication channel, the bandwidth request specifying a desired number of transmission slots of a frame; and
receiving an allocation command from the satellite that is configured to:
determine allocation of the transmission slots of the frame based upon the received bandwidth request, and
distribute the allocated transmission slots throughout the frame according to a prescribed sequence, wherein the request has a time stamp that indicates a time of receipt of a previous allocation command, and the determining includes:
comparing the time stamp with an allocation timer value to determine whether the time stamp exceeds the allocation timer value; and
selectively discarding the request based upon the comparing.

23. The method as claimed in claim 20, wherein the bandwidth request is an original rate request, the method further comprising:
transmitting another bandwidth request that is a rate request associated with a fallback rate and superseding the original rate request, the fallback rate requesting a different number of transmission slots of the frame than the original rate request.

24. The method as claimed in claim 20, wherein the rate request and the volume request each has two levels of priority.

25. The method as claimed in claim 19, the method further comprising:
piggybacking a follow-up request to the satellite, the follow-up request being associated with the volume request and specifying additional desired transmission slots.

26. The method as claimed in claim 19, wherein the frame is a TDMA (Time Division Multiple Access) frame.

27. The method as claimed in claim 19, wherein the communication channel is a data channel or a contention channel.

28. A communication system for performing bandwidth allocations, the system comprising:
   a plurality of queues configured to store a bandwidth request received from a terminal over a communication channel, the bandwidth request specifying a desired number of transmission slots of a frame; and
   a bandwidth control processor communicating with the plurality of queues, the bandwidth control processor being configured to determine allocation of the transmission slots of the frame based upon a received bandwidth request that is stored in one of the plurality of queues, to distribute the allocated transmission slots throughout the fire according to a prescribed sequence, and to selectively send an allocation command identifying allocated transmission slots and one of a plurality of slot numbering patterns to the terminal, wherein the allocation command does not identify actual transmission slots that will be used by die terminal.

29. The system as claimed in claim 28, wherein the bandwidth request is a rate request or a volume request, the rate request specifying a constant number of transmission slots, the volume request specifying a specific number of transmission slots.

30. The system as claimed in claim 29, wherein a follow-up request from the terminal is stored in one of the plurality of queues, the follow-up request being associated with the volume request and specifying additional desired transmission slots, the bandwidth control processor being selectively configured to discard the follow-up request based upon traffic load.

31. A communication system for performing bandwidth allocations, comprising:
   a plurality of queues configured to store a bandwidth request received from a terminal over a communication channel, the bandwidth request specifying a desired number of transmission slots of a frame; and
   a bandwidth control processor communicating with the plurality of queues, the bandwidth control processor being configured to determine allocation of the transmission slots of the frame based upon a received bandwidth request that is stored in one of the plurality of queues, to distribute the allocated transmission slots throughout the frame according to a prescribed sequence, and to selectively send an allocation command identifying the allocated transmission slots to the terminal, wherein the request has a time stamp that indicates a time of receipt of a previous allocation command by the terminal, the bandwidth control processor being configured to compare the time stamp with an allocation timer value to determine whether the time stamp exceeds the allocation timer value, and to selectively discard the request based upon the determination.

32. The system as clamed in claim 29, when the plurality of queues store at least two rate requests, one of the stored rate requests being associated with an original rate, another one of the stored rate requests being associated with a fallback rate requesting a different number of transmission slots of the frame than the original rate, the bandwidth control processor discarding the one rate request associated with the original rate.

33. The system as claimed in claim 29, wherein the rate request and the volume request each has two levels of priority.

34. The system as claimed in claim 29, wherein the plurality of queues are designated respectively as a high priority rate request queue, a low priority rate request queue, a high priority volume request queue, and a low priority volume request queue, the rate request queues being of higher priority than the volume request queues, the volume request queues being round-robin queues, the bandwidth control processor reserving a minimum number of transmission slots for the lower priority volume request queue.

35. The system as claimed in claim 28, wherein the plurality of queues store another bandwidth request from the terminal, the other bandwidth request being received using a previously allocated transmission slot.

36. The system as claimed in claim 28, wherein the frame is a TDMA (Time Division Multiple Access) frame.

37. The system as claimed in claim 28, wherein the communication channel is a data channel or a contention channel.

38. The method of claim 7, wherein the plurality of slot numbering patterns comprises four slot numbering patterns.

39. The method of claim 19, when the plurality of slot numbering patterns comprises four slot numbering patterns.

40. The communication system of claim 28, wherein the plurality of slot numbering patterns comprises four slot numbering patterns.

* * * * *